(12) United States Patent
Gyllenspetz et al.

(10) Patent No.: US 6,550,805 B1
(45) Date of Patent: Apr. 22, 2003

(54) OCCUPANT RESTRAINT BELT WITH INFLATABLE PRESENTER

(75) Inventors: Per Gyllenspetz, Gothenburg (SE); Bjorn Lundell, Gothenburg (SE); Gunnar Nilsson, Karna (SE); Henrik Wiberg, Gothenburg (SE); Per Ferdell, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,681

(22) Filed: Feb. 1, 2002

(51) Int. Cl.[7] ............................................. B60R 21/18
(52) U.S. Cl. .................. 280/733; 280/801.1; 297/481
(58) Field of Search ............................ 280/733, 801.1, 280/801.2, 807, 808; 297/468, 469, 481, 483, 486

(56) References Cited

U.S. PATENT DOCUMENTS

| 4,348,037 A | * | 9/1982 | Law et al. ............... 244/122 B |
| 4,687,254 A | | 8/1987 | Baumert et al. |
| 5,062,662 A | * | 11/1991 | Cameron ..................... 280/733 |
| 5,383,713 A | * | 1/1995 | Kamiyama et al. ......... 280/733 |
| 5,431,446 A | | 7/1995 | Czarnecki et al. |
| 6,082,763 A | * | 7/2000 | Kokeguchi .................. 280/733 |
| 6,142,511 A | * | 11/2000 | Lewis ......................... 280/733 |
| 6,237,945 B1 | | 5/2001 | Aboud et al. |
| 6,276,714 B1 | * | 8/2001 | Yoshioka ..................... 280/733 |
| 6,276,715 B1 | * | 8/2001 | Takeuchi .................. 280/728.1 |

FOREIGN PATENT DOCUMENTS

| DE | 3509984 | | 3/1985 | |
| DE | 4211672 A1 | * | 10/1993 | ................ 280/733 |

* cited by examiner

Primary Examiner—Paul N. Dickson
Assistant Examiner—Faye M. Fleming
(74) Attorney, Agent, or Firm—Gary A. Smith

(57) ABSTRACT

An occupant restraint belt for use with a seat of a motor vehicle has an inflatable section having a deflated condition wherein the belt assumes a stowed position and an inflated condition wherein the belt assumes a deployed position in which the belt is in a position making it easy for a seat occupant to see and grasp the belt in order to fasten it. The inflatable section is formed by sewing a layer of flexible material to the webbing that constitutes the main restraint member of the belt to form at least one gas-tight inflation chamber. The belt is inflated after an occupant is seated in the seat and ready to don the restraint belt. Inflation of the inflatable section preferably occurs upon activation by an electronic control system that receives inputs from one or more vehicle systems, such as a seat weight sensor, a door open/closed sensor, and/or an ignition switch. When inflated, the inflatable section is flexible and compliant enough that it will not cause any discomfort to the seat occupant if it should contact the occupant's body.

20 Claims, 2 Drawing Sheets

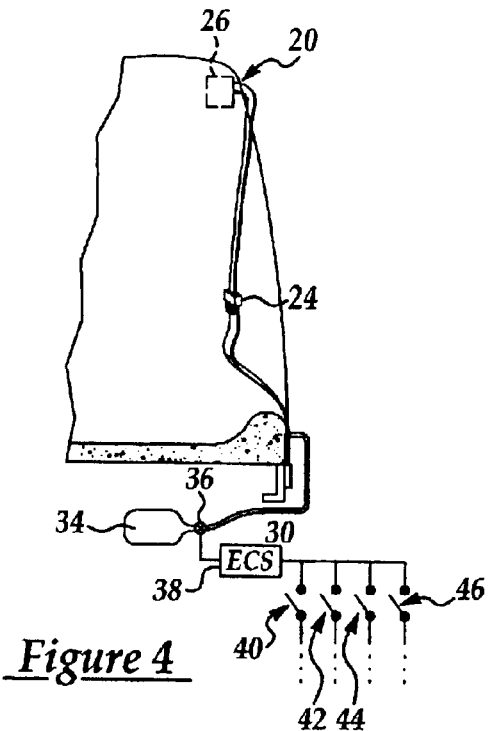
*Figure 4*
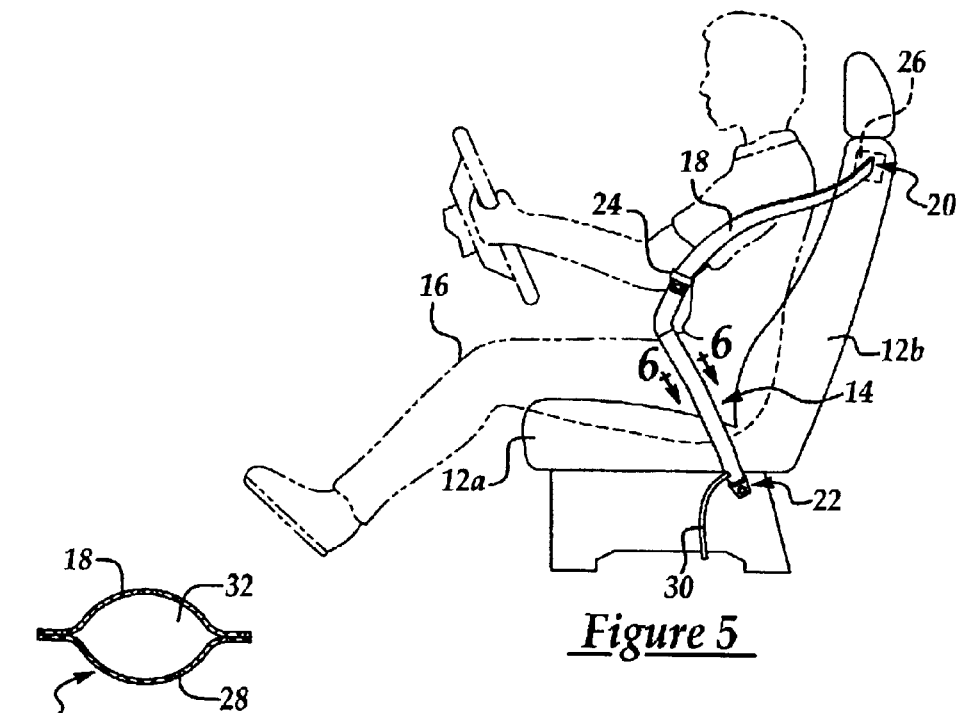
*Figure 5*
*Figure 6*

OCCUPANT RESTRAINT BELT WITH INFLATABLE PRESENTER

BACKGROUND OF THE INVENTION

1. Field of the Invention

The present invention relates generally to occupant restraint belts used in motor vehicles, and more specifically to a restraint belt with a presenter for making it easier for a person to see and grasp the belt in order to fasten the belt.

2. Background

Occupant restraint belts (also known as seat belts) are fitted to most types of passenger vehicles in order to protect vehicle occupants from injury during a crash or other abrupt deceleration of the vehicle. One limitation to the effectiveness of modern seat belts is that they require a voluntary and optional act by the occupant to fasten the belt properly around their body. Some persons do not use their vehicle's seat belts because they find it difficult or inconvenient to don the seat belt.

This difficulty in donning the belt is sometimes due to the fact that when the belt is in the unfastened condition, it must assume a stowed position in which it does not obstruct the occupant while entering or exiting the vehicle. Consequently, the seat belt is typically configured so that it is pulled to the rear by a retractor mechanism. With the belt in this stowed position, the buckles (or other portions of the belt) that the occupant must grasp in order to don the belt may be difficult to see and/or reach when in the seated position.

Systems have been proposed for moving a seat belt or buckle element upward and/or forwardly to a more easily grasped position after the occupant is seated in the seat. Examples of such systems are disclosed in U.S. Pat. Nos. 5,431,446 and 5,123,673.

SUMMARY OF INVENTION

The present invention provides an occupant restraint belt for use in combination with a seat of a motor vehicle. The belt has an inflatable presenter comprising an inflatable section having a deflated condition wherein the belt assumes a stowed position and an inflated condition wherein the belt assumes a deployed position in which the belt is in a position making it easy for a seat occupant to see and grasp the belt in order to fasten it. The inflatable section is inflated by a source of gas pressure carried on board the vehicle, such as a compressor, a pressure vessel, or a after an occupant is seated in the seat and ready to don the restraint belt.

Inflation of the inflatable section preferably occurs upon activation by an electronic control system that receives inputs from one or more vehicle systems, such as a seat weight sensor, a door open/closed sensor, and/or an ignition switch. When inflated, the inflatable section is flexible and compliant enough that it will not cause any discomfort to the seat occupant if it should contact the occupant's body.

In a preferred embodiment of the invention, the inflatable section comprises a layer of flexible material sewn or otherwise secured to the webbing that constitutes the main restraint member of the belt to form at least one gas-tight inflation chamber. The inflatable section when deflated has a generally flat cross-section and is approximately as flexible as the webbing alone. When inflated, the inflatable section expands in cross-section and so becomes substantially more rigid than when deflated. It is also possible to fabricate the inflatable section integrally with the webbing in a "one-piece woven" process, thereby eliminating the need to stitch a separate top layer to the webbing. The belt is secured to a lower anchor adjacent a lower side portion of the seat, and the inflatable section is disposed adjacent the lower anchor. The construction of the inflatable section is such that when inflated an upper end of the inflatable section moves forwardly and inwardly to the deployed condition, positioning the belt above the seat occupant's thigh so that it is easy to reach.

The invention further comprises method of moving an occupant restraint belt associated with a seat of a motor vehicle from a stowed position to a deployed position wherein the belt is relatively easily grasped, the method comprising the steps of: providing an inflatable section disposed on the belt and having a deflated condition wherein the inflatable section allows the restraint belt to assume the stowed position; connecting a source of gas pressure to the inflatable section, the source of gas pressure operable to selectively inflate and deflate the inflatable section; and causing the source of gas pressure to inflate the inflatable section thereby moving the belt to the deployed condition.

Other features and advantages of the present invention will be readily appreciated and better understood after reading the subsequent description when considered in connection with the accompanying drawings.

BRIEF DESCRIPTION OF DRAWINGS

FIG. 3A is a cross-sectional view along line 3—3 of FIG. 2 showing an alternative, one-piece belt construction.

FIG. 4 is a front view the presenter in a deployed condition.

FIG. 5 is a side view of the presenter of FIG. 4.

FIG. 6 is a cross-sectional view along line 6—6 of FIG. 5.

DETAILED DESCRIPTION

Figure 1:
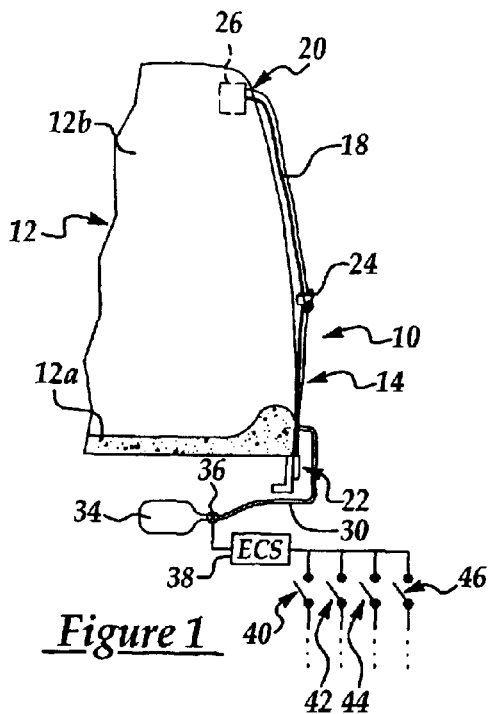
FIG. 1 is a front view of an embodiment of a seat belt presenter according to the present invention in combination with a vehicle seat, with the presenter in a stored condition.
Figure 2:
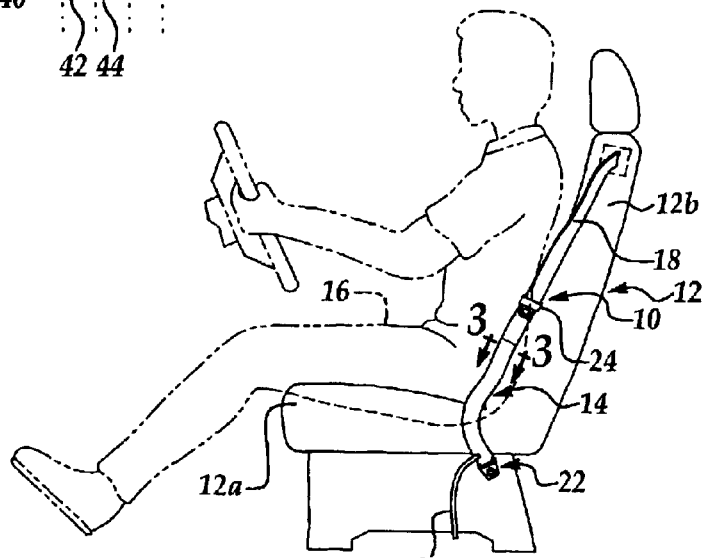
FIG. 2 is a side view of the presenter of FIG. 1.

Referring to FIGS. 1–6, an embodiment of a restraint belt 10 according to the present invention is shown installed in a vehicle having a seat 12. Seat 12 includes a generally upright seat back 12a for supporting the torso of a seated occupant 16 (indicated in phantom lines) and a generally horizontal seat cushion 12b projecting forwardly from the bottom portion of the seat back for supporting the pelvis and thighs of the occupant. For purposes of description only, the seat 12 will be referred to herein as having an inboard side and an outboard side, these terms referring to the sides of the seat adjacent to a center of a vehicle and an exterior side of a vehicle respectively, as is the case if the seat is located on the left side of the vehicle. This disclosure applies equally to a seat located at any position within a vehicle.

Restraint belt 10 comprises a three-point belt assembly having a length of flexible webbing 18 serving as a main restraint member. Webbing 18 is attached at an upper end to an upper anchor 20, and at a lower end to a lower anchor 22 adjacent the rear portion of the seat cushion 12b. A buckle element 24 such as a latch plate slides along the webbing 18 to allow adjustability, and is lockingly engageable with an inboard anchor (not shown) located adjacent the rear, inboard side of the seat cushion 12b. When buckle element 24 is lockingly engaged with the inboard anchor, webbing 18 defines a lap belt and a shoulder belt in a manner well known in the art to restrain the occupant 16 in the event of a crash or other abrupt deceleration of the vehicle.

As an alternative, the lap belt and shoulder belt may be formed as separate lengths of webbing connected by a fitting (not shown) that includes a buckle element engageable with the inboard anchor.

The upper anchor 20 preferably comprises a belt retractor 26 that may be housed within seat back 12a (as shown), or mounted to a portion of the vehicle structure such as a roof rail or B-pillar as is well known in the restraints art. Belt retractor 26 is operative to retract webbing 18 when it is not fastened about occupant 16, provide for adjustment of the length of the belt for varying-sized seat occupants, and properly position the seat belt, as is well known in the art. Belt retractor 26 may include load limiter and/or belt pretensioner devices (not shown) of the type well known in the restraints art.

Figure 3A:
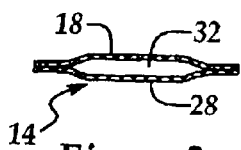
FIG. 3A is a cross-sectional view along line 3—3 of FIG. 2.

Belt 10 comprises an inflatable section 14 located adjacent lower anchor 22. In the depicted embodiment of the invention, inflatable section 14 is formed by stitching or otherwise securing a top layer 28 of flexible, impermeable material to webbing 18. The inflatable section 14 is constructed to have a flat, strap-like cross-section, as seen in FIG. 3A, with the space between the webbing 18 and the top layer 28 constituting an inflation chamber 32. Top layer 28 is secured to webbing 18 at least along both edges and both ends of the top layer so that inflation chamber 32 is substantially gas-tight. Inflation chamber 32 need not be one large, tubular section, but instead may be divided into multiple sections. The multiple sections of an inflation chamber may be separated from one another, or they may be connected with one another to permit some amount of gas flow between them.

Figure 3B:
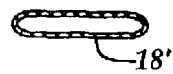

Alternatively, it is possible to fabricate a belt according to the invention wherein the inflatable section is formed integrally with the webbing. This may be accomplished, as shown in FIG. 3B, by manufacturing the webbing 18' as a flat, two-layer, tubular structure in, for example, a "one-piece woven" technique. This type of construction eliminates the need to stitch a separate top layer to the webbing. The upper end of the inflation chamber is defined by stitching or otherwise sealing off the chamber so that the portion of the belt above the stitching does not inflate. The webbing 18' should be manufactured to naturally maintain a flat condition. It is also possible to fabricate inflatable section 14 as a unit that is separate from webbing 18, and that is subsequently secured to the webbing. This may be achieved, for example, by fabricating a flexible tube (not shown) with closed ends that is sewn or otherwise secured to webbing 18 in the desired location to define inflatable section 14.

A hose 30 extends between inflation chamber 32 and a pressure source 34 (see FIG. 1), which may be located anywhere on board the vehicle. Pressure source 34 preferably comprises a pressure vessel that is recharged by an air compressor (not shown). A valve 36 may be provided to control the flow of gas from the pressure source 34 into the hose 30. Pressure source 34 may also supply pneumatic power to other vehicle systems such as an air suspension system (not shown).

An electronic control system (ECS) 38, indicated schematically in FIG. 1, controls pressure source 34 and/or valve 36 to control the flow of pressurized gas from the pressure source through hose 30 into inflatable section 14. ECS 38 receives signals from one or more vehicle systems, such as a seat weight sensor 40, a door status indicator switch 42, a buckle status switch 44, and an ignition switch 46.

Prior to occupant 16 being seated in seat 12, inflatable section 14 is in the deflated condition and belt 10 is in the stowed position wherein the belt is unfastened and belt retractor 26 draws webbing 18 upward so that it extends in a substantially straight line between upper anchor 20 and lower anchor 22. In the stowed condition, belt 10 offers little or no interference with a seat occupant 16 entering or exiting the vehicle. See FIGS. 1 and 2. In the deflated condition, inflatable section 14 does not significantly affect the flexibility of belt 10, and so allows the belt to assume the stowed position.

ECS 38 activates pressure source 34 and/or valve 36 so as to force gas through hose 30 and into inflatable section 14 after occupant 16 is seated in seat 12 and ready to don the seat belt. ECS 38 may, for example, inflate belt 10 in response to a "seat occupied" indication from seat weight sensor 40, and/or a "door closed" indication from door condition sensor 42, and/or in response to an "on" indication from ignition key 46.

When inflatable section 14 inflates it expands in cross-section so that it is no longer flat and, as a result, becomes substantially more rigid than when deflated. Inflatable section 14 is shaped and attached to lower anchor 22 in a manner such that when the inflatable section is in the inflated, rigid condition it assumes a deployed condition shown in FIGS. 4 and 5. In the deployed condition, inflatable section 14 extends forwardly and inwardly with respect to the seat 12 and occupant 16 so that the occupant may grasp webbing 18 adjacent the upper end of inflatable section 14, pull the belt across his/her body, and fasten buckle element 24 to the inboard anchor. Movement of the belt to the deployed, graspable condition may require some amount of the webbing 18 to be drawn out of retractor 26, so inflation of inflatable section 14 must provide sufficient force to overcome the winding force of the retractor.

In a possible alternative to an electronically controlled pressure source, a pressure bladder (not shown) may be disposed within the seat cushion 12b and contain air or another gas. When an occupant sits on seat cushion, the pressure bladder is compressed by the occupant's body weight, and at least a portion of the gas contained in the bladder is forced into inflatable section 14 causing belt 10 to move to the deployed condition.

In the deployed condition, belt 10 is preferably adjacent or above the upper surface of the occupant's thigh and far enough forward and inward for the occupant to easily see and grasp the webbing 18. Inflatable section 14 remains somewhat flexible and compliant when in the inflated condition so that it does not cause any discomfort to occupant 16 if it contacts the occupant's body as it extends inward to present the belt. If, due to the geometry of seat 12, anchors 20,22, and/or other vehicle structure, inflatable section 14 must assume a complicated shape in order to properly position the belt in the deployed condition, this may be achieved by designing the inflatable section to include a multiple section inflation chamber 32.

After occupant 16 has fastened the seat belt, ECS 38 commands a deflation of inflatable section 14. The deflation may be triggered by buckle sensor 44 indicating that the seat belt is properly fastened, by a timer, or by any other appropriate condition or combination of conditions of vehicle systems.

A seat belt may be equipped with an inflatable section according to the invention anywhere along the length of the belt, including adjacent an upper belt anchor. An inflatable section disposed adjacent an upper anchor will move so that its lower end moves forward and/or inward when it deploys.

It is also possible for an inflatable section according to the present invention to be maintained in a state of partial inflation at times when it is desired that the belt be in the stowed condition. Inflatable section will be configured such that the partially inflated state gives belt a shape and a degree of rigidity that serves (along with the belt tension provided by belt retractors) to help retain the belt in the desired stowed condition in which it will not interfere with occupants entering and exiting the vehicle. The state of partial inflation may constitute inflation of the same inflation chamber or group of chambers that are used to achieve deployment, but at a reduced pressure. Or the state of partial inflation may constitute inflation of an inflation chamber or a group of chambers separate from those used to achieve deployment. In either case, the ECS is programmed to supply pressure to inflatable section in a manner to achieve the partially inflated state at desired times based on inputs from appropriate vehicle systems, of which those identified in FIG. 1 are possible examples.

As is apparent from the above description, the invention seat belt presenter provides a simple, effective, and unobtrusive apparatus for positioning a seat belt in an easily grasped position, thereby making it more convenient and comfortable for a seat occupant to properly fasten and wear the belt. The presenter is compliant even when in the inflated, deployed condition so that it will not cause discomfort if it should contact the occupant. This allows the presenter to work comfortably and effectively for occupants of any size and stature.

While the best modes for carrying out the invention have been described in detail, those familiar with the art to which this invention relates will recognize various alternative designs and embodiments for practicing the invention as defined by the appended claims.

What is claimed is:

1. An occupant restraint belt presenter system for use in combination with a seat of a motor vehicle, the presenter system comprising:
   a belt having an inflatable section having a deflated condition wherein the belt assumes a stowed position in which the belt is unfastened and offers relatively little interference with a seat occupant entering or exiting the vehicle, and the inflatable section having an inflated condition wherein the belt is urged to a deployed position in which the belt is unfastened and is positioned so that the seat occupant may easily grasp the belt to permit fastening of the belt; and
   a control system operative to inflate the inflatable section after the seat occupant has occupied the seat and before the belt is fastened around the occupant.

2. The apparatus according to claim 1 wherein the inflatable section in the deflated condition has a generally flat cross-section, and in the inflated condition has an expanded cross-section and is more rigid than when in the deflated condition.

3. The apparatus according to claim 2 wherein the inflatable section comprises a first layer of flexible material forming a main restraint member extending substantially a full length of the belt, and a second layer of flexible material secured to the first layer and having a length approximately equal to a length of the inflatable section.

4. The apparatus according to claim 2 wherein the inflatable section is formed integrally with a webbing portion of the belt as a two-layer, tubular structure.

5. The apparatus according to claim 1 wherein the belt has a lower end adapted to be secured to a lower anchor adjacent a lower side portion of the seat, and the inflatable section is disposed adjacent the lower end.

6. The apparatus according to claim 5 wherein the belt is adapted to extend between the lower anchor and an upper anchor adjacent an upper side portion of the seat.

7. The apparatus according to claim 5 wherein the inflatable section has an upper end distal from the lower anchor, the upper end when in the stowed condition being in a first position, and the upper end when in the deployed condition being in a second position relatively forward with respect to the seat.

8. The apparatus according to claim 1 wherein the inflatable section when in the inflated condition urges the belt forward with respect to the seat.

9. The apparatus according to claim 1 wherein the inflatable section when in the inflated condition urges the belt inward with respect to the seat.

10. The apparatus according to claim 1 further comprising a source of gas pressure connected with the inflatable section and operable to alternatively inflate and deflate the inflatable section.

11. The apparatus according to claim 1 wherein the control system is an electronic control system.

12. An occupant restraint belt presenter assembly for use in combination with a seat of a motor vehicle, the belt presenter assembly comprising:
    a lower anchor disposed adjacent a lower side portion of the seat;
    an upper anchor disposed adjacent an upper side portion of the seat;
    a belt having a lower end attached to the lower anchor, an upper end attached to the upper anchor and an inflatable section adjacent the lower end, the inflatable section having a deflated condition wherein the belt assumes a stowed position characterized by the belt extending substantially directly between the upper anchor and the lower anchor and the belt being unfastened, and an inflated condition wherein the belt assumes a deployed condition characterized by the inflatable section extending upwardly and forwardly from the lower end and the belt being unfastened; and
    a control system operative to inflate the inflatable section after an occupant has occupied the seat and before the belt is fastened around the occupant.

13. The apparatus according to claim 12 wherein the inflatable section in the deflated condition has a generally flat cross-section, and in the inflated condition has an expanded cross-section and is more rigid than when in the deflated condition.

14. The apparatus according to claim 13 wherein the inflatable section comprises a first layer of flexible material forming a main restraint member extending substantially a full length of the belt, and a second layer of flexible material secured to the first layer and having a length approximately equal to a length of the inflatable section.

15. The apparatus according to claim 13 wherein the inflatable section is formed integrally with a webbing portion of the belt as a two-layer, tubular structure.

16. A method of moving an occupant restraint belt associated with a seat of a motor vehicle from a stowed position wherein the belt is unfastened and offers relatively little interference with a seat occupant entering or exiting the vehicle to a deployed position wherein the belt is unfastened and is relatively easily grasped by the seat occupant, the method comprising the steps of:

providing an inflatable section disposed on the belt and having a deflated condition wherein the inflatable section allows the restraint belt to assume the stowed position;

connecting a source of gas pressure to the inflatable section, the source of gas pressure operable to selectively inflate and deflate the inflatable section; and causing the source of gas pressure to inflate the inflatable section after the seat occupant has occupied the seat and before the belt is fastened about the seat occupant thereby moving the belt to the deployed condition.

17. The method according to claim 16 wherein the inflatable member comprises a first layer of flexible material and a second layer of flexible material, the first and second layers secured to one another to define at least one inflation chamber therebetween, the inflatable section when deflated having a generally flat cross-section, and when inflated having an expanded cross-section and being more rigid than when deflated.

18. The method according to claim 17 wherein the first layer comprises a main restraint member extending substantially a full length of the belt, and the second layer has a length approximately equal to a length of the inflatable section.

19. The method according to claim 16 wherein the step of causing the source of gas pressure to inflate the inflatable section comprises utilizing a control system that automatically inflates the member in response to indications from at least one vehicle system.

20. The method according to claim 16 wherein the belt has a lower end adapted to be secured to a lower anchor adjacent a lower side portion of the seat, and the inflatable section is disposed adjacent the lower end.

* * * * *